Sept. 16, 1930. R. H. PETERS 1,776,007

KEY BOLT

Filed Aug. 20, 1927

INVENTOR
Robert H. Peters,
By Parker & Rockwood,
ATTORNEYS.

Patented Sept. 16, 1930

1,776,007

UNITED STATES PATENT OFFICE

ROBERT H. PETERS, OF BUFFALO, NEW YORK, ASSIGNOR TO KEYBOLT APPLIANCE CO., OF ELMIRA, NEW YORK

KEY BOLT

Application filed August 20, 1927. Serial No. 214,366.

This invention relates to key bolts and more particularly to means for preventing the wedge or key of a key bolt from becoming loosened or disconnected from the bolt.

The objects of this invention are to provide a key bolt which is so constructed as to prevent a wedge or key from being accidentally released from the bolt; also to provide a washer of improved construction which may be used in connection with a key bolt to prevent displacement of the key from the bolt; also to improve the construction of key bolts in other respects hereinafter specified.

In the accompanying drawings.

Figure 1:
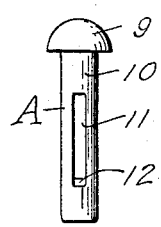
Fig. 1 is a side view of a key bolt with the key or wedge removed therefrom.
Figure 2:
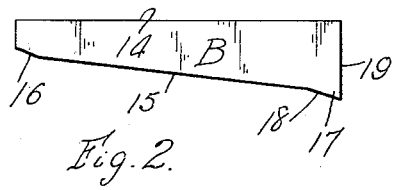
Fig. 2 is a side view of the key or wedge used in connection with the bolt.
Figure 5:
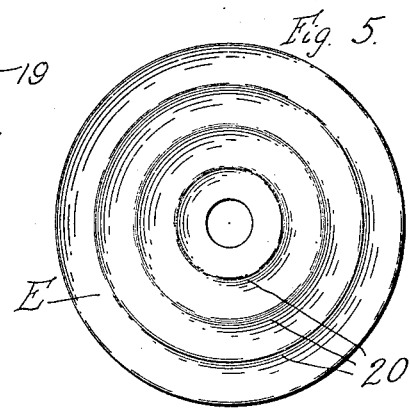
Fig. 5 is a face view of a washer adapted for use in connection with my improved key bolt.
Figure 3:
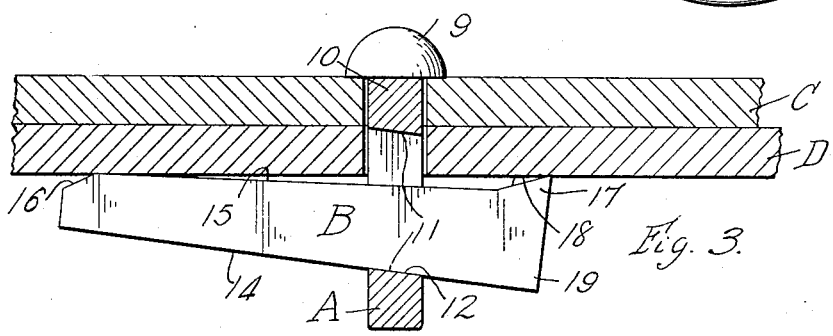
Fig. 3 is a sectional elevation of a key bolt, embodying my improvement, applied to a pair of plates.

A represents the bolt having the usual head 9 and a shank 10 provided with the usual slot 11 extending lengthwise thereof, the outer end of the slot being preferably tapered or inclined as indicated at 12. B represents the key or wedge adapted to cooperate with the slot 12. The wedge or key has an edge 14 which is substantially straight throughout its length and at its opposite side the wedge or key is provided with an edge 15 inclined with reference to the edge 14. The edge 15 is preferably provided at the narrowest portion of the wedge or key with a beveled or inclined portion 16 which facilitates the placing of the key in its holding or gripping position, and the edge 15 is also provided with a spur or projecting portion 17, which may be of any suitable or desired form, that shown being formed by an edge 18 extending at an angle or inclination to the edge 15, thus slightly increasing the width of the key or wedge at the widest portion thereof, and terminating at an acute angle at the end 19 of the key. By forming the key in this manner, the keys may be economically cut from a strip of material of a width equal to the length of the keys. The object of this projection or spur will be evident by reference to Fig. 3 in which the key or wedge is shown in operative relation to the key bolt for holding two members, such for example as plates C and D in correct relation to each other. The spur or projection 17, because of the angular relation of the edges 18 and 19 offers little resistance to the driving of the key or wedge into its operative position, or to the left in Fig. 3, but the acute angle resists the movement of the key in the opposite direction, since such movement will cause the projection or spur to penetrate or cut slightly into the surface of the plate D. This penetration is only slight and if it is desired to remove the bolt, the wedge B can be easily released by striking the narrow end thereof with a hammer or other implement. By providing the inclined or bevelled face 16, no sharp corner or edge resists the movement of the key or wedge to the left in Fig. 3 into its engaging position.

Figure 4:
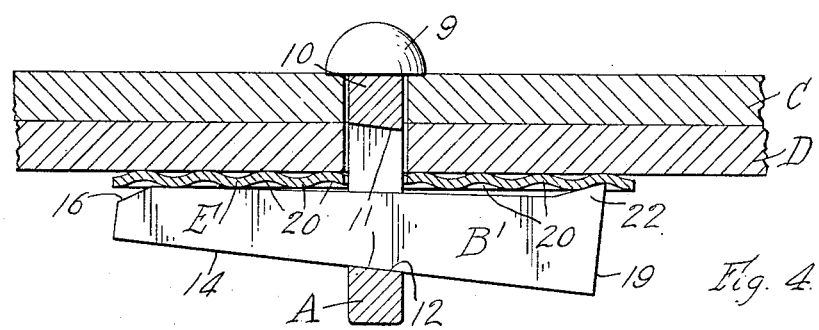
Fig. 4 is a slightly modified form of key bolt used in connection with a washer for holding together a pair of plates.

In the particular construction shown in Fig. 4, a corrugated or undulating member or washer E which is preferably made with a series of annular corrugations 20 is interposed between the plates or structural members and the wedge or key B'. The washer is provided with a hole or aperture through which the bolt A passes and the washer constitutes an additional member to be secured by the key bolt together with the members C and D. When a washer E is used the key or wedge is preferably provided with a somewhat longer spur or projection, for example, such as the projection 22 shown in Fig. 4. The washer described has the advantages that the annular corrugations thereof cooperate with the projection or prong 22 of the key or wedge to form an additional resistance to the accidental displacement of the wedge or key, since the prong or projection entering into a corrugation cannot be accidentally displaced from its holding position. Furthermore the washer has the advantage that the surfaces of the members connected by the key bolt are not in any way damaged by the penetration of the projection or prong of the key. The key may be readily driven out of its holding position shown in Fig. 4 by striking the smaller end thereof with a hammer or other implement.

The projections or prongs on the wedges may be of any suitable or desired shape and need not be formed at the extreme ends of the keys or wedges, although the particular construction illustrated has been found very desirable and effective. By means of the construction described, key bolts can be used as permanent connections between members or parts, since the accidental removal of the keys or wedges due to vibrations or shocks to which the structures are subjected, which has heretofore stood in the way of the use of key bolts as permanent connections, is eliminated by the structure described.

I claim as my invention:—

The combination of a slotted bolt adapted to connect a plurality of members, one of said members being in the form of a washer having a plurality of shallow annular corrugations, and a wedge key adapted to pass through said slot for drawing said members together and having a projection adapted to cooperate with said corrugations to resist movement of said key out of said slot and to penetrate the surface of said washer to resist movement of said key out of said bolt.

ROBERT H. PETERS.